Figure 1:
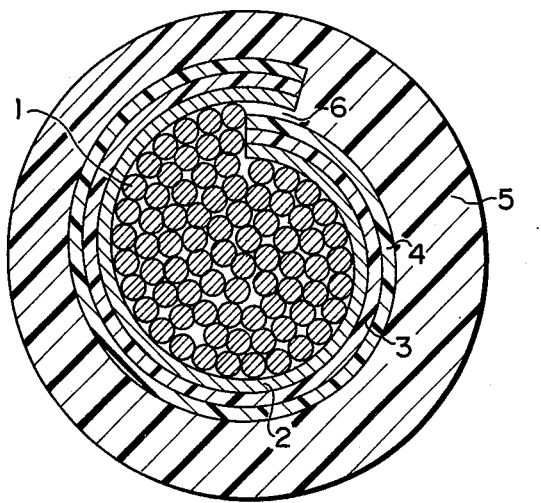

United States Patent [19]

Iwami et al.

[11] 3,998,990
[45] Dec. 21, 1976

[54] SUBSTRATES ADHERED VIA IONOMER RESINS

[75] Inventors: Isamu Iwami, Tokyo; Hironobu Kawasaki, Yokohama; Kenichi Hattori, Kawasaki, all of Japan

[73] Assignee: Asahi Dow Limited, Tokyo, Japan

[22] Filed: Jan. 15, 1975

[21] Appl. No.: 541,096

Related U.S. Application Data

[63] Continuation-in-part of Ser. No. 299,618, Dec. 11, 1972, abandoned.

[30] Foreign Application Priority Data

Oct. 11, 1971 Japan .............................. 46-79496
July 11, 1972 Japan .............................. 47-69480

[52] U.S. Cl. .............................. 428/442; 428/463; 428/474; 428/518; 428/520; 156/327
[51] Int. Cl.² .............................. B32B 17/10
[58] Field of Search .......... 428/441, 442, 461, 463, 428/474, 516, 515, 518, 511, 514, 520; 156/334, 327

[56] References Cited

UNITED STATES PATENTS

| | | | |
|---|---|---|---|
| 3,249,570 | 5/1966 | Potts et al. ................ | 260/29.6 |
| 3,264,272 | 8/1966 | Rees ............................ | 260/78.5 |
| 3,344,014 | 9/1967 | Rees ............................ | 428/442 |
| 3,582,455 | 6/1971 | De Lap et al. .............. | 428/520 |
| 3,681,515 | 8/1972 | Mildner ...................... | 174/107 |
| 3,687,748 | 8/1972 | Clock et al. ................ | 428/313 |
| 3,764,458 | 10/1973 | Ziegel ......................... | 161/190 |
| 3,876,452 | 4/1975 | Anspon et al. .............. | 117/76 P |

*Primary Examiner*—William J. Van Balen
*Attorney, Agent, or Firm*—Armstrong, Nikaido & Wegner

[57] ABSTRACT

Laminates of metal-containing copolymers between various kinds of substrates can be prepared with good results, where the copolymers consist of the following monomeric units:

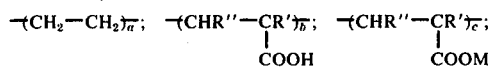

and 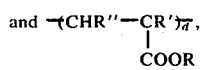

wherein M is metal; R is a lower alkyl; R' and R" show, individually, hydrogen atom, a lower alkyl having 1 – 5 carbon atoms; and $a$, $b$, $c$ and $d$ are the respective mol numbers of the above-mentioned four units and have the following relations:

$$\frac{b+c+d}{a+b+c+d} \times 100 = 0.5 \text{ to } 25 \text{ \% by mol}$$

$$\frac{b+c}{b+c+d} \times 100 = 30 \text{ to } 99 \text{ \% by mol}$$

and $$0 < \left(\frac{c}{b+c} \times 100\right) < 10 \text{ \% by mol}$$

14 Claims, 2 Drawing Figures

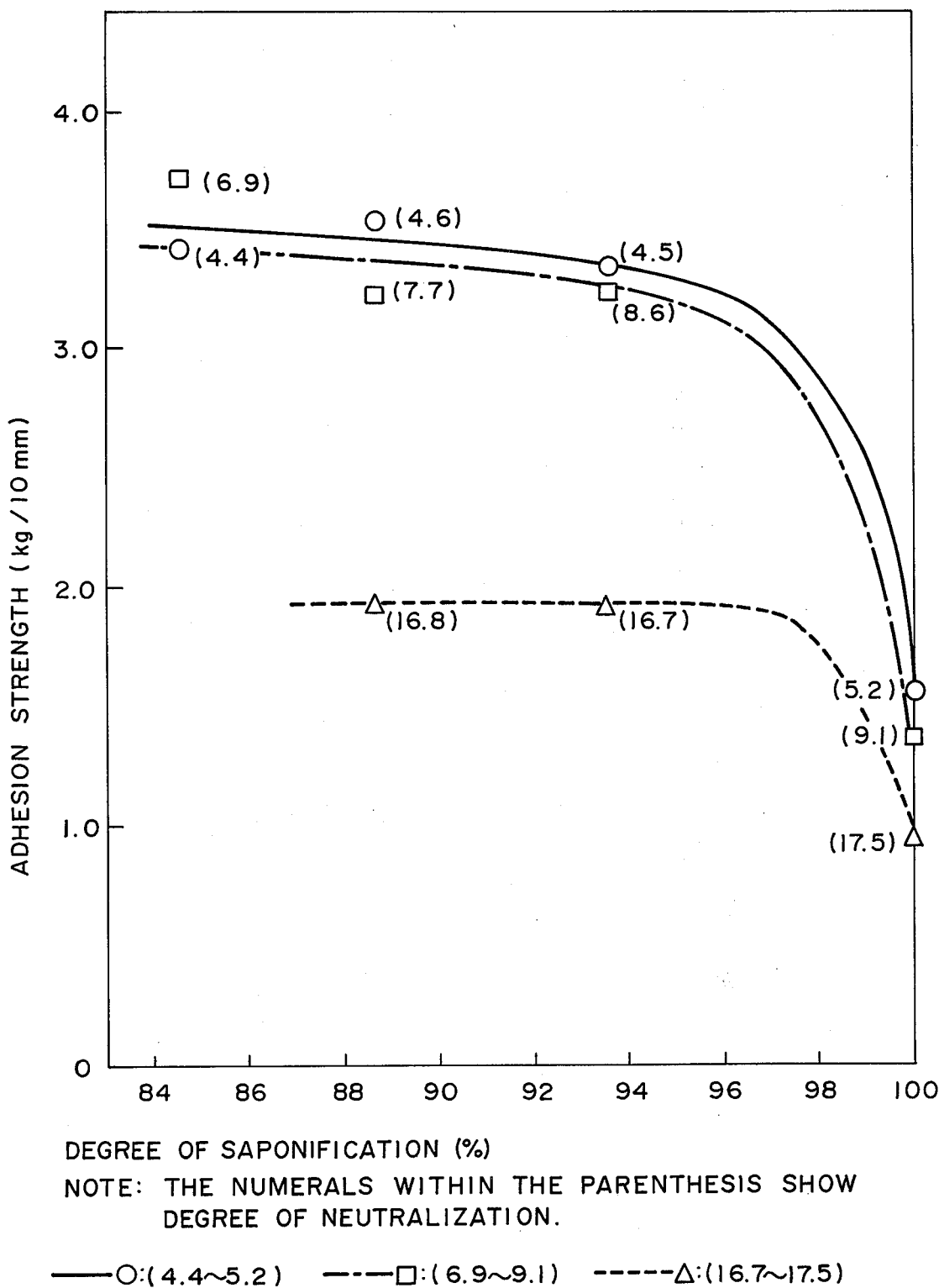

SUBSTRATES ADHERED VIA IONOMER RESINS

CROSS REFERENCE TO RELATED APPLICATION

This application is a continuation-in-part application of application Ser. No. 299,618, filed on Dec. 11, 1972, now abandoned, in the U.S. Patent Office.

DESCRIPTION OF THE INVENTION

The present invention relates to laminates of adhesive resins between various kinds of substrates. More particularly, it relates to the use of adhesive resins in the form of metal-containing copolymers consisting of monomeric units of ethylene, unsaturated carboxylic acid, unsaturated carboxylic acid metal salt, and unsaturated carboxylic acid ester, which are excellent in workability and melt-strength at the time of processing and also excellent in adhesiveness onto various kinds of substrates, and laminates thereof onto various kinds of substrates.

As for an application field of laminates relative to the present invention, there is illustrated, for example, a veneer of metals in which an adhesive resin is used. The adhesion of a veneer of two metals is usually carried out by preheating two metal sheets, inserting a film-shaped ethylenic copolymer containing a carboxylic group therebetween and heating the resulting laminate under pressure, but workability at the time of processing is inferior since the rigidity of said film-shaped copolymer is generally not suitable, and such film often is broken during the molten state on account of its insufficient strength at the time of melting.

Thus, an improvement for overcoming these drawbacks has heretofore been desired.

Furthere, as for another application field, there is illustrated "alpeth" cable for communication in which a polyolefin laminated on a metal is used. Such a laminate is preprared in most cases by inserting a layer or layers of other components because polyolefins are generally inferior in their adhesiveness with metals.

For example, there is known a five-layers laminate cable composed, in the order from the centre to the surface, of a cable core, an aluminum (Al), a resin called "Surlyn A" ([Registered trade mark] made by E.I. du Pont de Nemours & Co.), an ethylene-vinyl acetate copolymer (EVA) or an ethylene-ethyl acrylate copolymer (EEA) which is used to assist the adhesion of Surlyn A to a sheath polyethylene, and further a sheath polyethylene layer. However, the construction of such a five layers laminate lacks economical value because it is too complicated in the point of materials as well as in the point of processing.

As one of the processes for constructing such a five layers laminate, there is a process wherein a double layer film (D.L.) of Surlyn A/EVA or Surlyn A/EEA is prepared in advance and then it is utilized in forming the structure but there is a problem in the point of the control of the surface and back sides of D.L., and further, in any way, there is a problem in the point that the adhesion at the seaming part of Al/Surlyn A/EVA (or EEA) is inferior. See the accompanying reference drawing (FIG. 1), wherein numerals 1, 2, 3, 4, 5 and 6 show cable core, aluminum, Surlyn A, EVA or EEA, sheath polyethylene and seaming part, respectively.

On the other hand, it has been attempted to substitute a single layer film (S.L.) of an ethylene-unsaturated carboxylic acid copolymer for the above-mentioned D.L. In this case, the control of the surface and back sides is unnecessary unlike the case of D.L. due to its single layer, but its adhesiveness is not sufficient.

Further, conventional D.L. and S.L. used in this application field have such drawbacks that their workability is inferior due to their unsuitable rigidity of film and also breakage at the time of melting often occurs.

Thus, a S.L. which does not have the above-mentioned drawbacks and shows a superior adhesiveness to Al and a sheath polyethylene in the laminated state, has been desired for a long time in view of workability, control, economy and adhesion at the seaming part.

Further, as the application fields of laminates relative to the present invention, there are a laminate of nylon and Surlyn A and a laminate having placed Surlyn A between nylon and polyethylene. Such laminates have a low permeability of gas and steam, an excellent heat-sealability and superior properties of oil-resistance, abraision-resistance, etc., and hence, extensive application fields have been expected, but their adhesiveness is insufficient and its improvement has been desired.

Furthermore, as an application field of laminates, there is a triple layer film of Surlyn A/ vinyl chloride resin/vinylidene chloride resin being used for packaging of processed meats, but such film has also a problem in adhesiveness.

In addition, there is a laminate of nylon and metal, and their adhesion is carried out by coating the surface of nylon with a resorcinol type adhesive, and after curing, applying an epoxy type adhesive, but such adhesion is not desirable since it requires cumbersome processes such as coating of adhesive, drying, application on each other, etc. Further, the adhesiveness of the laminate thus obtained is not sufficient.

The object of the present invention is to provide an ethylenic copolymer which is an adhesive composition meeting the adhesion requirements of recent advanced and varied substrates, and after strenuous studies for obtaining such an ethylenic copolymer suitable for laminating the above-mentioned substrates, with which copolymer various kinds of substrates having different properties can be laminated together to give laminates having desirable properties, we have attained the present invention.

The adhesive resin of the present invention which is a metal-containing is charcterized by: first, superior adhesiveness to various kinds of substrates; second, inexpensive cost of production; and third, convenience in the production of laminates by using this adhesive resin.

The characteristics of the present invention will be further illustrated, particularly, referring to the case where the metal-containing copolymer of the present invention is applied to the production of a laminate of metal and polyolefin.

Ethylenic copolymers having carboxylic acid groups have, generally, superior adhesiveness to either metal and polyolefin. Further, preparation of a laminate by inserting an olefinic copolymer having carboxylic acid groups between a metal and plastic material is disclosed in French Patent No. 1,268,469. However, the laminate thus obtained is insufficient in adhesion strength. It is believed that this seems to lie in the following fact: When an ethylenic copolymer having carboxylic acid groups is inserted between a metal and polyolefin, and the resulting laminate is subjected to adhesion on heating under pressure, the ethylenic copolymer having carboxylic acid groups, since it is mostly used in the form of foil (depending upon the type of laminate to be prepared), is brought to a very "compatible" state with the polyolefin, and the resins existing on the surface of the metal at the time of the adhesion form a mixture of the above-mentioned two kinds of the polymers, whereby the concentration of carboxylic groups in the resins on the surface of the metal is reduced by dilution due to the above-mentioned compatible states so remarkably that the adhesion between the metal and the resins is lowered.

We have studied various processes for preventing such a compatible state, and as a result, have found that substitution of a part of the carboxylic acid group of the ethylenic copolymer to be inserted, by a metal carboxylate group, can prevent the copolymer from being brought into too compatible a state with pololefin to more than the necessary extent, while still maintaining the adhesiveness of the copolymer between metal and polyolefin, whereby a laminate of metal/a metal-containing copolymer/polyolefin, having a superior adhesiveness can be formed.

When the copolymer of the present invention is inserted between a metal and a polyolefin to form a laminate, one layer of such a copolymer will be sufficient. This is advantageous in the preparation of laminates so far as processing and economy are concerned.

Further, the above-mentioned problems in workability and melt-breakage, of the resins having been used so far in this application field, have been successfully solved according to the present invention. It is believed that this has been effected by the fact that said copolymer contains metal carboxylate groups in addition to carboxylic acid groups and carboxylic acid ester groups, in such a range of amount that the copolymer does not harm its adhesiveness to substrate. In short, in order that metal-containing copolymers maintain a superior adhesiveness to individual substrates, the amount of metal carboxylate groups as expressed by the degree of neutralization mentioned below must be less than 10%.

Next, the metal-containing copolymer of the present invention will be illustrated.

A Metal-containing copolymer

The metal-containing copolymers of the present invention consist of the following units of [A], [B], [C] and [D]:

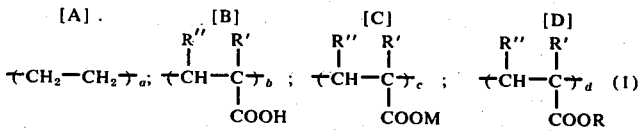

These units in the copolymers can be arranged in any order, in either of straight or branched chain and in any form of sequential block copolymer, random copolymer, graft copolymer, and a mixture of such copolymers.

A. shows ethylene monomer units.

B. shows monomer units of $\alpha,\beta$-ethylenically unsaturated carboxylic acid having 3 – 9 carbon atoms, such as acrylic acid, methacrylic acid, ethacrylic acid, etc.

C. shows monomer units of a metal salt of an $\alpha,\beta$-ethylenically unsaturated carboxylic acid having 3 – 9 carbon atoms, such as metal salts of the unsaturated carboxylic acids as described in the above-mentioned [B]. The metals referred to therein are those of Groups I-A, I-B, II-A, II-B, III-A and VIII of the Periodic Table of elements (cf. Periodic Table of the Elements described in the 4th edition of Chemical Engineer's Handbook by John H. Perry, Mc-Graw-Hill, issued from KOGAKUSHA), such as Na, K, Cu, Mg, Ca, Ba, Zn, Cd, Al, Fe, Co, Ni, etc.

D. shows monomer units of an ester of an $\alpha,\beta$-ethylenically unsaturated carboxylic acid having 4 – 10 carbon atoms, such as methyl acrylate, ethyl acrylate, methyl methacrylate, butyl methacrylate, etc.

In the above-mentioned formula (1), M shows a metal; R shows a $C_1$–$C_5$ alkyl group; R' and R'' show, individually, hydrogen atom, a lower alkyl having 1 – 5 carbon atoms; and a, b, c and d are the total number of mols of each monomer unit [A], [B], [C] and [D], respectively, in the copolymer.

There are the following relationships among a, b, c and d:

$$\frac{b+c+d}{a+b+c+d} \times 100 = 0.5 \text{ to } 25\% \text{ by mol (preferably, 1 to 20\%, further preferably 3 to 10\%)} \quad (i)$$

$$\frac{b+c}{b+c+d} \times 100 = 30 \text{ to } 99\% \text{ by mol (preferably 70 to 97\%, further preferably 70 – 95\%)} \quad (ii)$$

$$0 < \frac{c}{b+c} \times 100 \; (=N) < 10\% \text{ by mol (preferably, } 1 \leqq N \leqq 8\%, \text{ further preferably, } 3 \leqq N \leqq 8\%), \text{ wherein } N \text{ is the Degree of Neutralization.} \quad (iii)$$

The excellent adhesiveness of the metal-containing copolymer of the present invention to various kinds of substrates is due to the presence of the carboxylic acid ester groups in combination with the carboxylic acid groups and metal carboxylic groups.

Further, the adhesiveness of the metal-containing copolymer in cases where it is used for adhesion to polyolefin depends upon the constituting components and compositions of the intervening metal-containing copolymer and the kinds of polyolefin.

When the composition of the metal-containing copolymer is expressed by $$\frac{b+c}{a+b+c+d} \times 100 \geqq 3 \text{ or}$$

$$\frac{c}{b+c} \times 100 \quad 3 \text{ or, when}$$

the polyolefin substrate does not contain any polar groups such as vinyl ester groups and carboxylic acid ester groups, as contained in ethylene-vinyl acetate copolymer and ethylene-ethyl acrylate copolymer, it is particularly effective for the metal-containing copolymer to contain carboxylic acid ester groups.

The metal-containing copolymer of the present invention can be used for the production of the following laminates: laminates having the metal-containing copolymer placed between at least two substrates selected from the group consisting of metals, glasses, polyolefins, polyamide resins, vinyl chloride resins, vinylidene chloride resins.

Next, the substrates onto which the metal-containing copolymer of the present invention is applied as adhesive, will be illustrated.

B Substrate

B-1 Metals

A metal or metals selected from among the metals belonging to I-B, II-B, III-A, IV-A, VI-B and VIII groups of the Periodic Table of Elements such as Cu, Zn, Cd, Al, Sn, Pb, Cr, Fe, Co, Ni, etc., and an alloy or alloys containing said metal or metals as at least one component thereof.

B-2 Glasses

Silicate glass, borate glass, phosphate glass, silicoborate glass, soda ash glass, lead glass, crown glass, flint glass, non-alkali glass, etc.

These glasses can be used in various forms such as sheet, glass cloth, etc.

B-3 Polyolefins

Homopolymers of $\alpha$-olefins and copolymers containing $\alpha$-olefins such as low density polyethylene, high density polyethylene, ethylene-vinyl acetate copolymer, ethylene-methyl methacrylate copolymer, ethylene-ethyl acrylate copolymer, polypropylene, ethylene-propylene copolymer, polybutene-1, copolymer having grafted styrene on polyethylene, etc. Further, the above-mentioned polymers can be used in a mixture of at least two kinds thereof. Furthermore, these polymers can be used in a mixture thereof with at least one member selected from the group consisting of other kinds of polymers, calcium carbonate, glass fibers, carbon black, etc.

B-4 Polyamide resins

Synthetic high molecular weight polymers containing carboxylic acid amide linkage, -CONH-, such as nylon 6, nylon 66, nylon 11, nylon 12, N-alkoxy-modified nylon, etc. Further, these polymers can be used in a mixture of at least two kinds thereof. Furthermore, to these polymers can be added crystal nucleus agents such as phosphorus compounds, ores, e.g. corundum, etc., or reinforcing glass, etc.

B-5 Vinyl chloride resins

Homopolymers of vinyl chloride and copolymers containing vinyl chloride such as polyvinyl chloride, vinyl chloride-vinyl acetate copolymer, vinyl chloride-vinylidene chloride copolymer, vinyl chloride-acrylonitrile copolymer, graft-copolymer having grafted vinyl chloride on ethylene-vinyl acetate copolymer, etc. Further, these polymers can be used in a mixture of at least two kinds thereof. Furthermore, blends thereof with butadiene-styrene-acrylonitrile copolymer, chlorinated polyethylene, etc. can be used. Still further, to these polymers can be added plasticizers such as dioctyl phthalate, triethyl citrate, etc., usual stabilizers, etc.

B-6 Vinylidene chloride resins

Copolymers containing vinylidene chloride, such as vinylidene chloride-vinyl chloride copolymer, vinylidene chloride-vinyl acetate copolymer, etc. Further, to these copolymers can be added plasticizers, stabilizers, etc.

Next, the preparations of the metal-containing copolymer will be illustrated.

As for an embodiment of the preparations a copolymer of ethylene and an $\alpha,\beta$-ethylenically unsaturated carboxylic acid ester (which will be referred to as the primary copolymer) having an unsaturated carboxylic acid ester content of 0.5 – 25% by mol is subjected to the action of a basic metal compound (i.e. so-called saponification reaction) in a reaction medium to convert a desired amount of the carboxylic acid ester groups of the copolymer to metal carboxylate groups and carboxylic acid groups and then the resulting metal-containing copolymer having a high degree of neutralization, is subjected to the action of an inorganic acid or/and an organic acid such as sulfuric acid, hydrochloric acid, phosphoric acid, nitric acid, formic acid, acetic acid, butyric acid, etc., in a reaction medium such as water and/or a lower aliphatic alcohol and/or an aromatic hydrocarbon, to give a metal-containing copolymer having the desired degree of neutralization within the range set forth in formula (iii). According to this preparation, a metal-containing copolymer having the desired amount of carboxylic acid ester groups can be prepared by using the same primary copolymer, and, hence, this preparation is the most desirable. As the above-mentioned reaction medium for saponification, lower aliphatic alcohols such as methanol, isopropanol, etc. and a reaction medium mixture thereof with at least one kind of compound selected from the group consisting of aromatic hydrocarbons such as benzene, xylene, etc., hydroaromatic hydrocarbons such as cyclohexane, etc., aliphatic hydrocarbons such as hexane, etc., halogenated aromatic hydrocarbons such as chlorobenzenes, etc., can be used.

As for the saponification temperature, a range of 80° – 150° C is preferable.

Further, additives such as heat-stabilizers, UV-stabilizers, antiblocking agents, etc. can be added to the metal-containing copolymer of the present invention.

As for the laminating forms or states of the laminates of the present invention, the following can be illustrated: a laminate having a low density polyethylene containing carbon black further coated on metal-containing copolymer-aluminum foil layers prepared in advance (which can be used, for example, as a coating material for cables for communication); a resin-coated steel pipe in which the outer surface of said steel pipe is coated with the above-mentioned metal-containing copolymer and further coated thereon with a high density polyethylene; etc.

The polyolefins in the above-mentioned forms or states may be mainly of uniformly shaped articles, but also of non-uniformly shaped articles such as foamed articles, honey-comb structure, etc. For example, a laminate consisting of a metal plate, a thin layer of the metal-containing copolymer and a foamed polyethylene further coated thereupon, can be illustrated.

Further, there are illustrated laminates having the metal-containing copolymer adhered between nylon and polyethylene. Further, as an embodiment of laminates, there is illustrated H-shape steel having laminated on one surface thereof, the metal-containing copolymer and further, nylon thereon, which is used as a rail for carrying iron materials. As another embodiment of laminates, there is illustrated a bottle, the outer surface being of vinylidene chloride resin, the inner surface being of polyethylene and the metal-containing copolymer being adhered therebetween. Further, as other embodiments of laminates, there are illustrated vinylidene chloride resin/metal-containing copolymer/polyethylene; vinylidene chloride resin/metal-containing copolymer/aluminum foil; vinyl chloride resin/metal-containing copolymer/nylon; etc. Various kinds of combinations of the metal-containing copolymer and substrates can be employed according to the object.

For example, there can be illustrated a laminate having a layer of the metal-containing copolymer placed between more than two substrates, e.g. substrate A/metal-containing copolymer/substrate B/substrate C; or substrate A/metal-containing copolymer/substrate B/metal-containing copolymer/substrate C. A, B, C and D can be different or same.

As for the coating and adhesion processes of the metal-containing copolymer of the present invention, the following can be illustrated: a process in which a film of the metal-containing copolymer is adhered to a preheated metal foil, a cable core is packaged with the resulting laminate and a sheath polyethylene is extruded on the laminate to coat the latter; a process in which the metal-containing copolymer and a high density polyethylene are coated on the outer surface of a steel pipe according to a two layer extrusion method; a process in which a film of the metal-containing copolymer is placed on a metal plate, and further a polyethylene sheet is placed on the resulting layers, followed by heat and pressure to achieve adhesion; a process in which powders of the metal-containing copolymer are spread on a metal plate and further powders of a high density polyethylene are spread thereon, followed by heating to produce a laminate; a process in which the metal-containing copolymer is dissolved in a solvent, the resulting solution is coated on a metal or a polyolefin substrate, and after drying, a polyolefin or a metal is placed thereon, followed by heat and pressure to achieve adhesion; a process for forming a laminate by double-layer-extruding the metal-containing copolymer and nylon onto iron and steel materials; a process for forming a laminate by placing a film of the metal-containing copolymer between glass and metal foil and subjecting them to heating from the side of the metal foil to achieve adhesion; a process for producing a bottle of three layers by subjecting vinylidene chloride resin, the metal-containing copolymer and polyethylene to hollow molding according to triple layer extrusion method; etc.

The following examples are illustrated without limiting the scope of the present invention.

The evaluation methods for adhesion strength of the laminates employed in the examples are as follows:

Evaluation method [A]

(metal substrate/metal-containing copolymer-polyolefin)

I. Adhesion conditions:

A film of the metal-containing polymer (50 microns thick) was inserted between a metal foil (200 microns thick) and a polyolefin sheet (1.5 mm thick). Adhesion was carried out under the conditions of temperature, 150° C; pressure, 2.0 Kg/cm$^2$; and time, 60 seconds.

II. Peeling conditions:

A test piece having a width of 10 mm and a length of 150 mm was cut off from the laminate obtained according to the above-mentioned method [I]. The adhesion strength of this test piece was evaluated by means of a tensile tester. The peeling angle and peeling velocity at this time were 180° and 50 mm/min., respectively. The area measured was a part being at the central portion of the test piece and having a distance of 50 mm. As for the adhesion strength, the minimum of the values measured with this area was recorded.

III. Designation of adhesion strength:

Five points per one sample were measured, and adhesion strength was designated by their average value.

Evaluation method [B]

(metal substrate/metal-containing copolymer/metal substrate)

I. Adhesion conditions:

A film of the metal-containing copolymer having a thickness of 150 microns was inserted between two metal foils each having a thickness of 200 microns. Adhesion was carried out under the conditions of temperature, 150° C; pressure, 2.0 Kg/cm$^2$; and time, 30 seconds.

II. Peeling conditions:
Same as in Evaluation method [A] [II].

III. Designation of adhesion strength:
Same as in Evaluation method [A] [III].

Evaluation method [C]

(metal substrate/metal-containing copolymer).

The method is the same as Evaluation method [B] except that the laminate consists of two layers of an aluminum foil (product O of Mitsubishi Aluminum K.K., Japan; thickness, 200 microns) and the metal-containing copolymer having a thickness of 1000 μ.

Evaluation method [D]

(polyolefin/metal-containing copolymer)

The method is the same as Evaluation method [A] except that the laminate consists of two layers of a sheath polyethylene (DFD-0506 of Nihon Unicar K.K., Japan; thickness: 1.5 mm) and the metal-containing copolymer having a thickness of 1000 μ.

The method for determining 2% modulus is as follows:

| (1) | Preparation of test piece: | |
|---|---|---|
| | Dimension: | 13 mm wide and 130 mm long (gage mark: 50 mm) |
| | Annealing: | Left standing in a thermostat chamber at 23° C and 50% RH for 48 hours. |
| | Measurement of width and thickness of test piece: | |
| | Width: | Mean value is recorded by measuring the width at five points between the gage marks. |
| | Thickness: | Minimum value is recorded by measuring the thickness at 5 points between the gage marks. |
| (2) | Measurement: | Stress is recorded at 2% elongation when measured at a drawing rate of 10 mm/min. with a tensile tester. |
| (3) | Calculation: | |
| | $M = \dfrac{F}{A \times 0.02}$ | |
| | M | : 2% modulus (Kg/cm$^2$) |
| | F | : Stress at 2% elongation (Kg) |
| | A | : Minimum cross-sectional area at |

-continued initial stage (cm²)

Five points per one sample were measured, and 2% modulus was disignated by their average value.

EXAMPLE 1

A copolymer of ethylene-methyl methacrylate having a melt index of 10.2 g/10 min. (according to ASTM-D-1238-62T) and a methyl methacrylate content of 18.4% by weight prepared by means of the ordinary high pressure process polyethylene producing apparatus, was saponified in a reaction medium mixture of isopropanol and xylene with caustic soda, whereby a saponification reaction product having a degree of saponification of 91% by mol was obtained.

The degree of saponification can be represented by the following formula, using the symbols of formula (1):

Degree of saponification $$(\% \text{ by mol}) = \frac{b+c}{b+c+d} \times 100$$

The saponification reaction product was subjected to the action of acetic acid to give a metal-containing copolymer having a degree of neutralization of 3.6% by mol, which was then subjected to film-making.

The adhesiveness was evaluated, using an aluminum foil and a sheath polyethylene (product DFD-0506 [trade name]made by Nihon Unicar K.K., Japan) according to the evaluation method [A]. The result is given in Tables 1 and 3.

In the evaluation of said adhesiveness, the adhesiveness was also evaluated, using a steel plate (cold-rolled steel plate SPCC SD, thickness: 0.8 mm, JIS-G-3141) in place of the aluminum, according to the evaluation method [A]. Further, the adhesiveness was evaluated, using a low density polyethylene (density: 0.921 g/cm³, melt index: 3.0 g/10 min.), a high density polyethylene (density: 0.961 g/cm³, melt index: 1.5 g/10 min.) and a sheath polyethylene of another type [a mixture of 90 parts by weight of a low density polyethylene (density: 0.919 g/cm³, melt index: 0.3 g/10 min.), 10 parts by weight of a copolymer of ethylene-vinyl acetate (vinyl acetate content: 25% by weight) and 3.5 parts by weight of furnace type carbon black], in place of the sheath polyethylene. The results are given in Table 1.

Further the adhesiveness of the film was evaluated, using an aluminum foil (product 0 [trade name]made by Mitsubishi Aluminum K.K., Japan) according to the evaluation method [B]. 2% Modulus was measured by the above-mentioned method. The results are given in Table 3.

Table 1

Adhesion strength of laminate
(metal/metal-containing copolymer/polyolefin)

| Metal | Polyolefin | Adhesion strength (Kg/10 mm) |
|---|---|---|
| Aluminum | Sheath polyethylene | 3.5 |
| Steel plate | Sheath polyethylene | 4.5 |
| Aluminum | Low density polyethylene | 3.6 |
| Aluminum | High density polyethylene | 2.5*) |
| Aluminum | Sheath polyethylene of | 3.7 |

Table 1-continued

Adhesion strength of laminate
(metal/metal-containing copolymer/polyolefin)

| Metal | Polyolefin | Adhesion strength (Kg/10 mm) |
|---|---|---|
| | another type | |

Note: *)Adhesion temperature: 170° C

EXAMPLE 2

The metal-containing copolymer obtained in Example 1 was admixed with 1,000 ppm of 4,4'-thiobis(6-tert.-butyl-m-cresol), and the adhesiveness was evaluated, using an aluminum foil and a sheath polyethylene according to the evaluation method [A]. 2% Modulus was measured by the above-mentioned method. The results are given in Table 3. Further, its physical properties were evaluated, and the result is given in Table 2.

Table 2

| Property | Test Method | Unit | Value |
|---|---|---|---|
| Melt index | ASTM D-1238 | g/10 min. | 1.3 |
| Density | ASTM D-1505 | g/cm³ | 0.943 |
| Tensile strength | ASTM D-412 | Kg/cm² | 251 |
| Elongation | ASTM D-412 | | 485 |
| Heat stability | (100° C, 48 hr) | | |
| Tensile strength | ASTM D-412 | % | 95 |
| Elongation | ASTM D-412 | % | 103 |
| Low temperature brittleness | ASTM D-746 | −76° C) | 0/10 |
| Vicat softening point | ASTM D-1525 | ° C | 90 |
| Dissipation factor | ASTM D-150 | MH$_z$) | |
| Dielectric constant | ASTM D-150 | (1 MH$_z$) | 2.26 |
| ESCR | ASTM D-1693*1) | (1 week) | |

Note: *1)Annealed for 1 hour in 100° C water andtested in 10% Igepal solution

EXAMPLE 3

The saponification reaction product obtained in Example 1 was subjected to the action of hydrochloric acid to give a metal-containing copolymer having a degree of neutralization of 8.6% by mol. The adhesiveness was evaluated, using an aluminum foil and a sheath polyethylene according to the evaluation method [A]. 2% Modulus was measured by the above-mentioned method. The results are given in Table 3.

EXAMPLE 4

The copolymer of ethylene-methyl methacrylate used in Example 1 was saponified in a benzene-methanol reaction medium mixture with caustic soda, and further subjected to the action of acetic acid to give a metal-containing copolymer having a degree of saponification of 97.4% by mol and a degree of neutralization of 3.8% by mol. The adhesiveness was evaluated, using an aluminum foil and a sheath polyethylene according to the evaluation method [A]. The result is given in Table 3.

EXAMPLE 5

A copolymer of ethylene-methyl methacrylate (melt index: 10.2 g/10 min., methyl methacrylate content: 15.8% by weight) was saponified in a reaction medium mixture of isopropanol and xylene with caustic soda, and further subjected to the action of acetic acid to give a metal-containing copolymer having a degree of saponification of 86% by mol and a degree of neutralization of 3.9% by mol. The adhesiveness was evaluated, using an aluminum foil and a sheath polyethylene according to the evaluation method [A]. The result is given in Table 3.

EXAMPLE 6

A copolymer of ethylene-methyl methacrylate (melt index: 10.2 g/10 min., methyl methacrylate content: 15.0% by weight) was saponified in a reaction medium mixture of isopropanol and xylene with caustic soda, and further subjected to the action of acetic acid to give a metal-containing copolymer having a degree of saponification of 77% by mol and a degree of neutralization of 4.5% by mol. The adhesiveness was evaluated, using an aluminum foil and a sheath polyethylene according to the evaluation methods [A], [C] and [D]. The result is given in Table 3.

REFERENCE EXAMPLE 3

A copolymer of ethylene-methyl methacrylate (melt index: 10.2 g/10 min., methyl methacrylate content: 15.0% by weight) was saponified in a reaction medium mixture of isopropanol and xylene with caustic soda, and further subjected to the action of acetic acid to give ethylenic copolymer having a degree of saponification of 77% by mol and a degree of neutralization of 0% by mol. The adhesiveness was evaluated, using an aluminum foil and a sheath polyethylene according to the evaluation method [A], [C] and [D]. The result is given in Table 3.

REFERENCE EXAMPLE 4

Ionomer and a copolymer of ethylene-vinyl acetate (melt index: 2.0 g/10 min., vinyl acetate content: 8.0% by weight) were prepared into a double-layer film having a thickness of 25 microns for each layer by a double-layer film-making machine. The adhesiveness was evaluated, using an aluminum foil and a sheath polyethylene according to the evaluation method [A]. The result is given in Table 3.

Table 3

| | Adhesion strength and 2% modulus | | | | | | |
|---|---|---|---|---|---|---|---|
| | Metal-containing copolymer | | Adhesion strength (Kg/10 mm) | | | | |
| Example No. | Degree of saponification (mol %) | Degree of Neutralization (mol %) | Evaluation Method | | | | 2% Modulus (Kg/cm²) |
| | | | [A] | [B] | [C] | [D] | |
| 1 | 91 | 3.6 | 3.7 | 3.5 | | | 1500 |
| 2 | 91 | 3.6 | 3.3 | | | | 1520 |
| 3 | 91 | 8.6 | 3.0 | | | | 1890 |
| 4 | 97.4 | 3.8 | 3.4 | | | | |
| 5 | 86 | 3.9 | 3.2 | | | | |
| 6 | 77 | 4.5 | | | 3.4 | 3.2 3.5 | |
| Reference Example 1 | — | — | 2.4 | 2.8 | 3.0 | 3.1 | 1220 |
| 2 | Ionomer | | 1.4 2.2 | | | | |
| 3 | 77 | 0 | | | 3.3 | 4.0 | 970 |
| 4 | Ionomer/ ethylene-vinyl acetate copolymer | 3.5 | | | | | 1090 |

REFERENCE EXAMPLE 1

The adhesiveness of a copolymer of ethylene-acrylic acid (melt index: 5.5 g/10 min., acrylic acid content: 7.8% by weight) was evaluated, using an aluminum foil and a sheath polyethylene according to the evaluation methods [A], [B], [C], and [D]. The results are given in Table 3.

REFERENCE EXAMPLE 2

The adhesiveness of an ionomer which is an ethylene-methacrylic acid copolymer having a methacrylic acid content of 14% by weight and a neutralization degree of 15% by mol (this ionomer will be hereinafter abbreviated merely to ionomer) was evaluated, using an aluminum foil and a sheath polyethylene according to the evaluation methods [A]. The result is given in Table 3.

EXAMPLE 7

An ethylene-methyl methacrylate copolymer (the methyl methacrylate content: 12.4% by weight, and the melt index: 8.5 g/10 min.) was saponified in a reaction medium mixture of isopropanol and xylene, using caustic soda, followed by subjecting to the action of acetic acid to give as metal-containing copolymer, MC-1 and MC-2 having compositions expressed by the following formulas:

(MC-1):

$$\frac{b+c}{b+c+d} \times 100 = 77, \quad \frac{c}{b+c} \times 100 = 3.6$$

(MC-2):

-continued $$\frac{b+c}{b+c+d} \times 100 = 96, \quad \frac{c}{b+c} \times 100 = 3.0$$

Further, an ethylene-methyl methacrylate copolymer (the methyl methacrylate content: 21.4% by weight, and the melt index: 7.3 g/10 min.) was similarly saponified and treated as above to give MC-3 having a composition expressed by the following formula:

(MC-3):

$$\frac{b+c}{b+c+d} \times 100 = 85, \quad \frac{c}{b+c} \times 100 = 2.4$$

Next, the respective adhesiveness of the above-mentioned MC-1, MC-2 and MC-3 to aluminum (product 0; 200 microns thick), sheath polyethylene (DFD-0506; 1.0 mm thick) and nylon 6 (unstretched film made by Yunitika Co. Ltd. Japan; 0.1 mm thick), were evaluated.

As control sample to the metal-containing copolymer, ionomer (1.0 mm thick) and an ethylene-acrylic acid copolymer (SD-449 Registered REgistered trade mark] made by Dow Chemical Co. Ltd.; 1.0 mm thick) were used.

The evaluation method was as follows: each sheet of the metal-containing copolymer (1.0 mm thick) and each substrate are placed on each other, and they are subjected to adhesion under the condition of 180° C (but in the case of nylon, 200° C), 35 Kg/cm$^2$ and 3 minutes, using a compression molding machine. Next, the resulting laminates having a width of 15 mm were subjected to peel test using a tensile tester. The minumum valve of the peel-resistant strengths recorded at this time was made the adhesion strength, the cross-head speeds at this time were 300 mm/min., in the cases of aluminum and sheath polyethylene, and 100 mm/min. in the case of nylon. The results are shown in Table 4.

Table 4

| Sample | Adhesion strength Kg/15 mm | | |
|---|---|---|---|
| | Substrate Aluminum | Sheath polyethylene | Nylon 6 |
| MC-1 | 3.4 | 6.3 | >6.3 |
| MC-2 | 3.3 | 2.7 | — |
| MC-3 | >6.3 | 4.3 | >6.3 |
| Ionomer | 2.5 | 1.5 | 2.5 |
| Ethylene-acrylic acid copolymer | 2.2 | 3.2 | 1.5 |

EXAMPLE 8

An ethylene-methyl methylate copolymer (the methyl methacrylate content: 15.8% by weight, and the melt index: 8.5 g/10 min.) was saponified in a reaction medium mixture of isopropanol and xylene, using caustic soda, followed by subjecting to the action of acetic acid to give as the metal-containing copolymer, MC-4, MC-5, MC-6 and MC-7 having the compositions expressed by the following formulas:

(MC-4): $\frac{b+c}{b+c+d} \times 100 = 48.6 \quad \frac{c}{b+c} \times 100 = 2.4$ (MC-5): $\frac{b+c}{b+c+d} \times 100 = 80.0 \quad \frac{c}{b+c} \times 100 = 0.9$ (MC-6): $\frac{b+c}{b+c+d} \times 100 = 80.0 \quad \frac{c}{b+c} \times 100 = 6.4$ (MC-7): $\frac{b+c}{b+c+d} \times 100 = 95.4 \quad \frac{c}{b+c} \times 100 = 1.0$ The adhesivenesses of the above-mentioned MC-4 — MC-7 to nylon 6 (0.1 mm thick) were evaluated.

As control samples, ionomer (1.0 mm thick), an ethylene-acrylic acid copolymer (SD-449; 1.0 mm thick) and an ethylene-vinyl acetate copolymer (Evatate H-2011 [trade mark] made by Sumitomo Kagaku Co. Ltd., Japan; 1.0 mm thick) were used.

The evaluation method was as follows:

Each sheet of the metal-containing copolymer (1.0 mm thick) and a nylon film are placed on each other, and they are subjected to adhesion under the conditions of 210° C, 2.8 Kg/cm$^2$ and 15 seconds, with heating under pressure. Next, the resulting laminates having a width of 10 mm were subjected to peel test using a tensile tester. The minimum value of the peel-resistant strength recorded at this time was made the adhesion strength. The cross-head speed at this time was 100 mm/min. The results are shown in Table 5.

Table 5

| Sample | Adhesion strength Kg/10 mm Substrate Nylon 6 |
|---|---|
| MC-4 | 1.22 |
| MC-5 | 2.82 |
| MC-6 | 1.69 |
| MC-7 | Nylon film broken |
| Ionomer | 0.37 |
| Ethylene-acrylic acid copolymer | 0.48 |
| Ethylene-vinyl acetate copolymer | 0.04 |

EXAMPLE 9

An ethylene-methyl methacrylate copolymer (the methyl methacrylate content: 18.4% by weight, and the melt index: 10.2 g/10 min.) was saponified in isopropanol using caustic soda and then treated with acetic acid to give as the metal-containing copolymer, MC-8, MC-9, MC-10 and MC-11 having the compositions expressed by the following formulas:

| | $\frac{b+c}{b+c+d} \times 100$ | $\frac{c}{b+c} \times 100$ |
|---|---|---|
| MC-8 | 77 | 0.4 |
| MC-9 | 91 | 3.6 |
| MC-10* | 91 | 3.3 |
| MC-11 | 95 | 8.6 |

*1000 ppm of 4,4'-thiobis(6-tert.-butyl-m-cresol) was blended therein.

Laminates having placed the respective films (50 microns thick) of the above-mentioned MC-8 — MC-11 between a steel plate (1 mm thick) and nylon 66 (2 mm thick) were prepared, and their adhesion strengths were evaluated.

The evaluation method was as follows:

A film of the metal-containing copolymer is placed on the steel plate, and further, nylon 66 is placed thereon. The resulting layers are then subjected to adhesion under the conditions of 190° C, 3 Kg/cm$^2$ and 90 seconds. Next, the adhesiveness is evaluated with respect to its tensile shear strength using a tensile tester.

As control samples to the metal-containing copolymer, an epoxy type adhesive (Araldite [Registered trade mark] made by Ciba-Geigy Co. Ltd.) and a resorcin type adhesive (KR-15 [Registered trade mark] made by Konishi Gisuke Shoten Co. Ltd., Japan) were used according to conventional method. The results are shown in Table 6.

Table 6

| Sample | Adhesion strength Kg/cm² Substrate Steel/ /Nylon 66 |
|---|---|
| MC-8 | 77 |
| MC-9 | 86 |
| MC-10 | 73 |
| MC-11 | 85 |
| Simultaneous use of epoxy type adhesive and resorcin type adhesive | 49 |
| Resorcin type adhesive | Adhesion scarcely occurs |

EXAMPLE 10 an ethylene-methyl methacrylte copolymer (the methyl methacrylate content: 26.0% by weight, and the melt index: 8.9g/10 min.) was saponified in a reaction medium mixture of isopropanol and xylene using caustic soda and then treated with acetic acid to give as the metal-containing copolymer, MC-12 and MC-13 having the compositions expressed by the formulas:

|  | $\frac{b+c}{b+c+d} \times 100$ | $\frac{c}{b+c} \times 100$ |
|---|---|---|
| MC-12 | 63 | 1.5 |
| MC-13 | 83 | 6.2 |

The adhesiveness of MC-12 and MC-13 to vinylidene chloride resin (Saran roll film 635 type [Registered trade mark] made by Asahi Dow Ltd., Japan; 40 microns thick) were evaluated.

The evaluation method was as follows:

Adhesion of the above-mentioned substrate film onto metal-containing copolymer sheet (1 mm thick) is carried out under the conditions of 155° C, 5 Kg/cm² and 30 seconds, and the peel-resistant strength is measured using a tensile tester. The cross-head speed at this time was 200 mm/10 min. and the width of the samples was 25 mm.

As control samples, ionomer (1.0 mm thick), an ethylene-acrylic acid copolymer (SD-449; 1.0 mm thick), and and ethylene-vinyl acetate copolymer (Evatate D-2021; 1.0 mm thick) were evaluated together. The results are shown in Table 7.

Table 7

| Sample | Adhesion strength (Kg/25 mm) Substrate | Vinylidene chloride resin |
|---|---|---|
| MC-12 | | >2.0 |
| MC-13 | | >2.0 |
| Ionomer | | 0.05 |
| Ethylene-acrylic acid copolymer | | 0 |
| Ethylene-vinyl acetate copolymer | | 0.02 |

EXAMPLE 11

An ethylene-methyl methacrylate copolymer (the methyl methacrylate content: 15.1% by weight, and the melt index: 10.2 g/10 min.) was saponified in a reaction medium mixture of isopropanol and xylene, using caustic soda, and then treated with acetic acid to give as the metal-containing copolymer, MC-14, MC-15, MC-16 and MC-17 having the compositions expressed by the following formulas:

|  | $\frac{b+c}{b+c+d} \times 100$ | $\frac{c}{b+c} \times 100$ |
|---|---|---|
| MC-14 | 45 | 1.0 |
| MC-15 | 70 | 0.9 |
| MC-16 | 90 | 0.5 |
| MC-17 | 99 | 1.0 |

The respective adhesivenesses of the above-mentioned EC-14 to EC-17 to glass were evaluated.

The evaluation method was as follows:

The above-mentioned substrate was adhered onto the metal-containing copolymer sheets (1 mm thick) on heating under pressure, and then the respective peel-resistant strengths are evaluated using a tensile tester. The conditions of heating and pressure were as follows:

| Substrate | Condition Temperature (° C) | Pressure (Kg/cm²) | Time (sec.) |
|---|---|---|---|
| Glass | 180 | 0.7 | 15 |

The cross-head speed at the time of peel was 100 mm/min. As a control sample, ionomer was used. The results are shown in Table 8.

Table 8

| Substrate | Adhesion strength (Kg/10 mm) Sample | | | | |
|---|---|---|---|---|---|
|  | MC-14 | MC-15 | MC-16 | MC-17 | Ionomer |
| Glass | 1.08 | 0.72 | 0.92 | 0.66 | 0.54 |

EXAMPLES 12 –22

1. Preparation of sample

A copolymer of ethylene-methyl methacrylate having a content of methyl methacrylate of 18.2% by weight and a melt index (according to ASTM-D-1238-62T) of 13.2 g/10 min., prepared by using a usual high pressure polyethylene polymerization apparatus, was saponified by sodium hydroxide in a reaction medium of benzene-methanol so as to give saponification reaction products, and the resulting products were subjected to the action of sulfuric acid to carry out demetallization reaction, whereby metal-containing copolymers were prepared. The list of these copolymers thus prepared are shown in Table 9.

In the above-mentioned preparation, the degrees of saponification was adjusted by the amounts of sodium hydroxide used in the above-mentioned saponification and also the degree of neutralization was adjusted by the amount of acid used in the above-mentioned demetallization reaction.

In additiin, the degree of saponification and the degree of neutralization referred to herein are shown by the relationships $$\frac{b+c}{b+c+d} \times 100 \text{ and } \frac{c}{b+c} \times 100,$$

respectively using the formulas of equations (ii) and (iii) hereinbefore set forth in the specification.

TABLE 9

Degree of saponification and degree of neutralization of the metal-containing copolymer.

Table 9

| No. | Degree of saponification (% by mol) | Degree of neutralization (% by mol) |
|---|---|---|
| 12 | 84.5 | 4.4 |
| 13 | 84.5 | 6.9 |
| 14 | 88.6 | 4.6 |
| 15 | 88.6 | 7.7 |
| 16 | 88.6 | 16.8 |
| 17 | 93.5 | 4.5 |
| 18 | 93.5 | 8.6 |
| 19 | 93.5 | 16.7 |
| 20 | 100 | 5.2 |
| 21 | 100 | 9.1 |
| 22 | 100 | 17.5 |

2. Film-making

Metal-containing copolymers of Examples 12 –22 were made into films having a thickness of 70 μ (70±5μ), by the use of an inflation film-making machine of 20 mmφ, at a die temperature of 200° C.

3. Adhesion

The above-mentioned samples (films of metal-containing copolymers) were placed between an aluminum foil (o-material of 200 μ thick, manufactured by Mitsubishi Aluminum Co. Ltd., Japan) and a sheet of 1.9 mm thick of a sheath polyethylene (DFD-0506 manufactured by Nihon Unicar Co. Ltd.), and then adhesion was carried out at 170° C* (the side of aluminum foil alone was heated), under a pressure of 0.2 Kg/cm² and for 120 seconds by the use of a heat-sealer whereby laminates of three layers were obtained. * Note:

Practical adhesion temperatures are relatively high, and hence the adhesion temperature employed in the instant Experiment was made close thereto.

The effectiveness of the carboxylic acid ester group contained in the metal-containing copolymer, upon the adhesion strength is remarkable at relatively high temperatures.

4. Measurement of adhesion strength

Test pieces (10 mm wide, 150 mm long) were cut off from the laminates obtained above to evaluate the peel strength by means of a tensile tester. In this measurement, the peel angle was 180°; the peel velocity was 100 mm/min. as measured by cross-head speed; and the measured area was a part of 50 mm long at the central part in the lengthy direction, of the test-pieces. The adhesion strength was made the minimum value among those measured at the part of 50 mm. In addition, the measurement was carried out three times per one sample and the average values are shown in Table 10 and FIG. 2.

Table 10

| Sample No. | Adhesion strength (Kg/10 mm) |
|---|---|
| 12 | 3.4 |
| 13 | 3.7 |
| 14 | 3.5 |
| 15 | 3.2 |
| 16 | 1.9 |
| 17 | 3.3 |
| 18 | 3.2 |
| 19 | 1.9 |
| 20 | 1.5 |
| 21 | 1.3 |
| 22 | 0.9 |

As previously stated, the particular copolymers must satisfy the formulas (i), (ii) - degree of saponification and (iii) - degree of neutralization as hereinbefore set forth. From the results as shown in Examples 12 - 22, it can be seen from Tables 9, 10 and FIG. 2 that of the accompanying drawings that, as for the above-mentioned laminates, the adhesion strengths of laminates obtained by using metal-containing copolymers wherein the degree of saponification is 100%, i.e. no carboxylic ester groups are present, are considerably less than those obtained by using metal-containing copolymers wherein carboxylic ester groups are present. Furthermore, even if the degree of saponification is satisfied according to formula (ii), the degree of neutralization must also be satisified to obtain the particular copolymers having good adhesion. Therefore, even though Example 16 satisfies formula (ii) as to degree of saponification, the degree of neutralization is greater than 10, i.e., does not satisfy formula (iii) and, therefore, does not provide good adhesion. On the other hand, Examples 20 and 21 satisfy formula (iii), i.e., the degree of neutralization is less than 10, but the degree of saponification is 100% and does not satisfy formula (ii). Therefore, according to the results of Table 10, adhesion results are not desirable. Thus it is essential that the copolymers of the invention meet the requirements of formulas (i), (ii) and (iii) and it has been shown that such copolymers must meet the requirements of at least formulas (ii) and (iii) to obtain the desirable adhesion properties of the invention.

In place of the particular substrates and metal-containing copolymers employed in the above Examples, other substrates and metal-containing copolymers hereinbefore set forth may be substituted therefor to obtain substantially the same results.

What is claimed is:

1. A laminate having a layer of an adhesive metal ion-containing copolymer placed between at least two kinds of substrates selected from the group consisting of metals, glasses, polyolefins, polyamide resins, vinyl chloride resins and vinylidene chloride resins, said metal ion-containing copolymer consisting of the following monomeric units:

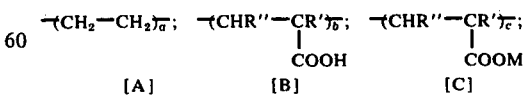

[A]   [B]   [C]

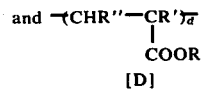

[D]

wherein

A. is monomeric units of ethylene;
B. is monomeric units of an α,β-ethylenically unsaturated carboxylic acid having 3 to 9 carbon atoms;
C. is monomeric units of a metal salt of an α,β-ethylenically unsaturated carboxylic acid having 3 to 9 carbon atoms; and
D. is monomeric units of an α, β-ethylenically unsaturated carboxylic acid ester having 4 to 10 carbon atoms, and M is a metal; R is a lower alkyl; R' is hydrogen or a lower alkyl having 1 – 5 carbon atoms; and R'' is hydrogen or a lower alkyl having 1 – 5 carbon atoms; and $a$, $b$, $c$ and $d$ are the mol numbers of [A], [B], [C] and [D], respectively and have therebetween satisified the requirements of the following relations:

$$\frac{b+c+d}{a+b+c+d} \times 100 = 0.5 \text{ to } 25 \text{ \% by mol}, \quad \text{(i)}$$

$$\frac{b+c}{b+c+d} \times 100 = 30 \text{ to } 99 \text{ \% by mol}, \quad \text{(ii)}$$

and $$0 < \left(\frac{c}{b+c} \times 100\right) < 10 \text{ \% by mol} \quad \text{(iii)}$$

where $a$, $b$, $c$ and $d$ are the total number of mols of each monomer unit [A], [B], [C] and [D], respectively, in the copolymer.

2. A laminate according to claim 1, wherein said two kinds of substrates are a metal and a polyolefin.

3. A laminate according to claim 2, wherein one of said substrates is at least one metal selected from the group consisting of the metals of Groups I-B, II-B, III-A, IV-A, VI-B and VIII of the Periodic Table.

4. A laminate according to claim 2, wherein one of said substrates is an alloy containing at least one metal selected from the group consisting of the metals of Groups I-B, II-B, III-A, IV-A, VI-B and VIII of the Periodic Table.

5. A laminate according to claim 2, wherein one of said substrates is aluminum.

6. A laminate according to claim 2, wherein one of said substrates is iron or steel.

7. A laminate of claim 2 wherein the polyolefin is one member selected from the group consisting of ethylene homopolymer, ethylene copolymer and a mixture thereof.

8. A laminate of claim 2 wherein the polyolefin is a mixture of one member selected from the group consisting of ethylene homopolymer, ethylene copolymer and a mixture thereof, with an additive.

9. A laminate of claim 8, wherein the additive is carbon black.

10. A laminate of claim 3, wherein said substrates are aluminum and a mixture of a copolymer of ethylene-vinyl acetate copolymer and polyethylene containing carbon black.

11. A laminate of claim 1, wherein said substrates are a polyamide resin and a polyolefin.

12. A laminate of claim 1 wherein said substrates are a polyvinylidene chloride resin and a polyolefin.

13. A laminate of claim 1, wherein said substrates are a metal and a polyamide resin.

14. A laminate of claim 1, wherein the metal ion-contaning polymer satisfies the relationship:

$$\frac{b+c+d}{a+b+c+d} \times 100 = 3 \text{ to } 10\% \text{ by mol}, \quad \text{(i)}$$

$$\frac{b+c}{b+c+d} \times 100 = 70 \text{ to } 97\% \text{ by mol}, \quad \text{(ii)}$$

and $$\frac{c}{b+c} \times 100 = 1 \text{ to } 8\% \text{ by mol}. \quad \text{(iii)}$$

* * * * *